United States Patent
Krüger et al.

(10) Patent No.: US 8,833,233 B2
(45) Date of Patent: Sep. 16, 2014

(54) BULLET-RESISTANT TRANSPARENT LAMINATE COMPOSITE AND PROTECTION ARRANGEMENT HAVING A BULLET-RESISTANT TRANSPARENT LAMINATE COMPOSITE

(75) Inventors: Thomas Krüger, Haseldorf (DE); Denni Hinrichsen, Hamburg (DE); Jan Hampel, Lichtenau (DE); Roger Schäfer, Paderborn (DE)

(73) Assignees: KRD Sicherheitstechnik GmbH, Geesthact (DE); ESW GmbH, Wedel (DE); IABG Lichtenau, Lichtenau (DE)

( * ) Notice: Subject to any disclaimer, the term of this patent is extended or adjusted under 35 U.S.C. 154(b) by 658 days.

(21) Appl. No.: 12/997,873
(22) PCT Filed: Jun. 12, 2009
(86) PCT No.: PCT/EP2009/004255
§ 371 (c)(1),
(2), (4) Date: Mar. 7, 2011
(87) PCT Pub. No.: WO2009/149951
PCT Pub. Date: Dec. 17, 2009

(65) Prior Publication Data
US 2011/0185884 A1 Aug. 4, 2011

(30) Foreign Application Priority Data
Jun. 13, 2008 (DE) .......................... 10 2008 028 318

(51) Int. Cl.
| | |
|---|---|
| *F41H 5/04* | (2006.01) |
| *F41H 5/26* | (2006.01) |
| *B32B 27/08* | (2006.01) |
| *B32B 17/10* | (2006.01) |
| *B32B 27/30* | (2006.01) |
| *B32B 7/12* | (2006.01) |

(52) U.S. Cl.
CPC *B32B 7/12* (2013.01); *F41H 5/263* (2013.01); *F41H 5/0407* (2013.01); *B32B 27/08* (2013.01); *B32B 17/10844* (2013.01); *B32B 27/30* (2013.01); *B32B 2369/00* (2013.01)
USPC ............................................ 89/905; 89/36.02

(58) Field of Classification Search
USPC .................................. 89/36.02, 905
See application file for complete search history.

(56) References Cited

U.S. PATENT DOCUMENTS

| | | | |
|---|---|---|---|
| 1,428,461 A | 9/1922 | Waitz | |
| 3,917,891 A * | 11/1975 | Cooke et al. .................. | 428/337 |

(Continued)

FOREIGN PATENT DOCUMENTS

| | | |
|---|---|---|
| DE | 232553 | 3/1911 |
| DE | 234569 | 3/1911 |

(Continued)

OTHER PUBLICATIONS

Haufe et al., "Zur Simulation von Sicherheitsglas unter stossartiger Belastung; Teil II: Validierung eines FE Modells fur Verbundsicherheitsglas," http://www.dynamore.de/documents/papers/forum2004/zur-simulation-von-sicherheitsglas-unter-1, XP002547930 (2004).

(Continued)

*Primary Examiner* — Jonathan C Weber
(74) *Attorney, Agent, or Firm* — Greer, Burns & Crain, Ltd.

(57) ABSTRACT

A bullet-resistant transparent laminate composite (10) has at least two plates (12) arranged one behind the other and at a spacing relative to each other in the direction of threat and comprising a transparent first material with a modulus of elasticity of at least about 1,500 N/mm$^2$, and a respective intermediate layer (14) of a transparent second material with a lower modulus of elasticity than that of the first material between two adjacent plates (12). The layer thicknesses of the plates (12) and the intermediate layer or layers (14) are so selected that the overall layer structure of the layer composite (10) of plates and intermediate layer or layers has a modulus of elasticity which is at least about 10% lower in comparison with a block made exclusively from the first material and of the same overall thickness.

10 Claims, 6 Drawing Sheets

(56) References Cited

U.S. PATENT DOCUMENTS

| | | | |
|---|---|---|---|
| 3,930,452 A | 1/1976 | Van Laethem et al. | |
| 4,321,777 A * | 3/1982 | Sauret et al. | 52/308 |
| 4,322,476 A | 3/1982 | Molari, Jr. | |
| 4,594,290 A | 6/1986 | Fischer et al. | |
| 4,595,624 A | 6/1986 | Greathead | |
| H1567 H * | 8/1996 | Parsons et al. | 89/36.02 |
| 5,747,170 A * | 5/1998 | Von Alpen et al. | 428/426 |
| 7,584,689 B2 * | 9/2009 | Jones et al. | 89/36.02 |
| 7,793,580 B2 * | 9/2010 | Jones et al. | 89/36.02 |
| 7,908,958 B2 * | 3/2011 | Mandelartz et al. | 89/36.02 |
| 8,025,004 B2 * | 9/2011 | Jones et al. | 89/36.02 |
| 8,176,828 B2 * | 5/2012 | Carberry et al. | 89/36.02 |
| 8,297,168 B2 * | 10/2012 | Jones et al. | 89/36.02 |
| 2006/0093804 A1 | 5/2006 | Weerth | |
| 2007/0068375 A1 * | 3/2007 | Jones et al. | 89/36.02 |
| 2007/0068376 A1 * | 3/2007 | Jones et al. | 89/36.02 |
| 2009/0217813 A1 * | 9/2009 | Carberry et al. | 89/36.02 |
| 2009/0308239 A1 * | 12/2009 | Jones et al. | 89/36.02 |
| 2010/0132540 A1 * | 6/2010 | Mandelartz et al. | 89/36.02 |
| 2010/0275767 A1 * | 11/2010 | Pinckney et al. | 89/36.02 |
| 2010/0288117 A1 * | 11/2010 | Jones et al. | 89/36.02 |
| 2010/0300276 A1 * | 12/2010 | Justamon | 89/36.02 |
| 2012/0001027 A1 * | 1/2012 | Jones et al. | 244/171.7 |

FOREIGN PATENT DOCUMENTS

| | | |
|---|---|---|
| DE | 1199152 | 8/1965 |
| DE | 3639781 | 6/1988 |
| DE | 9111130 | 1/1992 |
| DE | 19539607 | 4/1997 |
| EP | 0130886 | 1/1985 |
| EP | 0807797 | 11/1997 |
| EP | 1693640 A1 | 8/2006 |
| FR | 2516646 | 5/1983 |

OTHER PUBLICATIONS

Zhang, "Experimental and Numerical Studies of Laminated Glass Subject to Hypervelocity Impact." http://articles/adsabs.harvard.edu/cgi-bin/nph-iarticle_query; pp. 431-436 (Aug. 2005).

Arkema, "Plexiglas Expert," http://www.altuglas.com/expert/data/ue, XP002547932 (2006).

* cited by examiner

BULLET-RESISTANT TRANSPARENT LAMINATE COMPOSITE AND PROTECTION ARRANGEMENT HAVING A BULLET-RESISTANT TRANSPARENT LAMINATE COMPOSITE

CROSS-REFERENCE TO RELATED APPLICATIONS

The present application claims priority under 35 U.S.C. §120 to International Patent Application PCT/EP2009/004255, filed Jun. 12, 2009, entitled "BULLET-RESISTANT TRANSPARENT LAMINATE COMPOSITE AND PROTECTION ARRANGEMENT HAVING A BULLET-RESISTANT TRANSPARENT LAMINATE COMPOSITE," and international priority under 35 U.S.C. §119 to co-pending German Application DE 10 2008 028 318.5, filed Jun. 13, 2008, entitled "DURCHSCHUSSHEMMENDER TRANSPARENTER SCHICHTVERBUND UND SCHUTZANORDNUNG MIT EINEM DURCHSCHUSSHEMMENDEN TRANSPARENTEN SCHICHTVERBUND" and hereby incorporates the entire contents and disclosures of these applications herein by reference in their entirety.

BACKGROUND OF THE INVENTION

1. Field of the Invention

The present invention concerns a bullet-resistant transparent laminate composite, a process for the production thereof and a protection arrangement having a bullet-resistant transparent laminate composite.

2. Technical Background

Bullet-resistant transparent laminate composites which are frequently also referred to as bullet-resistant composite (glass) blocks or armoured glass panes are used in relation to observation slots, viewing openings and the like of protected objects or protective housings as protection from projectiles and shells. In that respect the field of use extends from craft and vehicles (land vehicles, marine craft, aircraft) through mobile arrangements to fixed installations (buildings, parts of buildings, machines and so forth). In addition such armoured glass panes are used both in the military area (for example armoured vehicles) and also in the civil area (for example personal protection, machine tools).

In general bullet-resistant transparent laminate composites comprise an arrangement of a plurality of plates of a transparent material, which are arranged one behind the other in the direction of the threat and which are connected together.

Thus for example DE 32 43 136 A1 discloses a composite glass block, held in a metal frame, for observation slots of armoured vehicles. That known composite glass block comprises a plurality of arrays of a plurality of silicate glass plates which are glued together by means of polyvinylbutyral layers and which are spaced from each other by way of gas-filled intermediate spaces and which are partially provided with integrated steel shields for catching deflected shells. At the rear side the composite glass block is provided with a polycarbonate plate and a polyurethane layer as fragment splinter protection.

WO 93/16872 A1 discloses a bullet-resistant composite glass block which, from the threat side, includes a plurality of glass panes, an acrylic glass pane and a polycarbonate plate. The glass panes are glued together by means of polyvinylbutyral while the other connections are formed with polyurethane. That composite glass block is distinguished in that it has a bullet-resistant action only from the threat side with the glass panes, but penetration from the inside outwardly is to be permitted. In addition the composite glass block described in that document is produced in a special press.

By virtue of the glass panes included in those conventional composite glass blocks the overall weight is relatively high, which causes difficulty in terms of installation thereof and possibly requires especially strengthened frame structures in the vehicles and the like.

A composite body which is lighter in comparison therewith, for the civil area, is disclosed in EP 0 807 797 A2. That composite body is made up of a plurality of acrylic glass panes which are arranged one behind the other and which are glued together with PVC-, PC- and/or PET-based, single-layer or multi-layer transparent plastic films. A pane of polycarbonate arranged on the rear side also serves in this case as fragment splinter protection.

In addition DE 195 48 338 A1 discloses an armoured pane structure for security motor vehicles with a plurality of composite panes which are arranged at a spacing one behind the other, wherein the intermediate spaces between the composite panes are filled with a fluid and at least one of the composite panes is inclined relative to its adjacent composite panes in relation to the direction of threat in order to provide for deflection of incident projectiles. The individual composite panes are composed of two armoured glass panes in plate form, which are glued together by means of a film. In this case also a polycarbonate pane is glued on the rear side of the armoured pane structure.

SUMMARY OF THE INVENTION

The object of the invention is to provide a transparent laminate composite of the kind set forth in the opening part of this specification, with improved bullet-resistant properties.

A further object of the invention is to provide a protection arrangement having a bullet-resistant transparent laminate composite which has improved protection properties.

In accordance with a first aspect of the invention the foregoing object is obtained by a bullet-resistant transparent laminate composite having at least two plates arranged one behind the other and at a spacing relative to each other in the direction of threat and comprising a transparent first material with a modulus of elasticity of at least about 1,500 N/mm², and a respective intermediate layer of a transparent second material with a lower modulus of elasticity than that of the first material between two adjacent plates. According to the invention the layer thicknesses of the plates and the intermediate layer or layers are so selected that the overall layer structure of the layer composite of plates and intermediate layer or layers has a modulus of elasticity which is at least about 10% lower in comparison with a block made exclusively from the first material and of the same overall thickness.

The term "laminate composite" in accordance with this invention denotes a composite body which is made up of a plurality of layers, wherein the individual layers and also the overall composite body can assume any shapes and sizes. In particular the layers are not just limited to rectangular shapes and the composite body is not just restricted to a parallelepipedic shape. Both flat and curved layers and composite bodies as well as layers and composite bodies both of uniform thicknesses and of varying thicknesses are also embraced by that term "laminate composite".

In the conventional bullet-resistant transparent laminate composites the intermediate layers of the transparent soft material are used exclusively for gluing the bullet-resistant plates consisting of the harder material such as for example glass or acrylic glass. In that case the adhesive layers were generally as thin as possible in order not to adversely affect the ballistic performance of the composite glass block. The modulus of elasticity of the overall laminate composite is thus scarcely altered in relation to that of the pure plate material. In contrast to the state of the art, the laminate composite constructed in accordance with the invention provides however that a function in relation to the bullet-resistant action of the overall body is attributed to the intermediate layers consisting of the transparent second material with a lower modulus of elasticity.

The inventors surprisingly found that larger layer thicknesses in respect of those intermediate layers of the softer material such that the overall layer structure of the composite body comprising plates and an intermediate layer or layers has a modulus of elasticity which is at least about 10% lower have the result that shells and projectiles are very effectively absorbed in the laminate composite and the rupture performance of the laminate composite by the shell or projectile penetrating thereinto is locally very restricted. The consequence of this is that the composite body remains transparent over large parts in the event of a hit and opposes a functional capability which is still intact to a further hit over large parts—that is to say apart from directly around the previous shell or projectile. The so-called multi-hit capability achieved here was not found with the previously known composite bodies or armoured glass panes of comparable weight.

Hit simulations and hit trials have shown that this improved functional capability of the bullet-resistant transparent laminate composite is afforded by the greater layer thickness of the intermediate layers consisting of the softer material, insofar as they elastically deform when a shell or projectile penetrates thereinto and penetrates therethrough and in that way absorb a very great deal of energy of the shell or projectile in a locally restricted region and also almost totally reflect and absorb the shock wave which is ahead of the shell or projectile. In other words, in the intermediate layers the arrangement affords highly effective dissipation of energy of the speed of the shell into elastic deformation and breakdown of the shock wave involvement which is usual in previously known structures, due to the layers of the composite body. The result of that is in turn that the shell or projectile is also further decelerated in the softer intermediate layers and upon further penetration through the composite body respectively impinges on still almost unscathed harder plates and softer intermediate layers.

Preferably the modulus of elasticity of the overall laminate composite is reduced by at least 20%, preferably by at least about 30%. In addition preferably the modulus of elasticity is reduced by a maximum of about 70%, preferably by a maximum of about 60% or a maximum of about 50%. The preferred value of the reduction made in the modulus of elasticity in relation to that of the first material is thus in the range of from about 30% to about 50%.

In addition the transparent first material of the plates can be a plastic material (for example acrylic glass), a glass (for example silicate glass), a ceramic or a combination of those materials. The transparent second material of the intermediate layer or layers can be a PU-, tPU-, PVC-, PC- and/or PET-based material.

In addition the intermediate layer or layers can selectively be of a single-layer or multi-layer structure. That choice depends not least on the desired layer thicknesses of the respective intermediate layer.

In an embodiment of the invention the laminate composite in the direction of threat is of an overall thickness in the region of about 20 mm to about 300 mm or 500 mm and more, preferably in the region of about 80 mm to about 200 mm, still more preferably in the region of about 100 mm to about 150 mm or in the region of about 115 mm to about 125 mm. The respective optimum thicknesses of the individual layers and the overall laminate composite are determined in dependence on the respective materials used and the expected threat.

In a further configuration of the invention the thicknesses of the plates are selected to be greater in a region on the side towards the threat than in a region on the side of the laminate composite, that is remote from the threat.

Furthermore it is possible for means (for example wires) for carrying tensile stresses to be provided in at least one intermediate layer in a region of the laminate composite, that is remote from the threat. Alternatively or additionally it is also possible for a pane heating means to be integrated in a plate on the side of the laminate composite, that is towards the threat, and/or in a plate on the side of the laminate composite, that is remote from the threat.

In yet a further configuration of the invention the laminate composite further has a plate or layer of polycarbonate as fragment protection on its side remote from the threat.

In addition the laminate composite can further be provided with a protection device against laser beams. For example a laser protection film can be applied on the side of the laminate composite, that is towards the threat, and/or the side of the laminate composite, that is remote from the threat.

In a further configuration of the invention the laminate composite can additionally be provided with a metal structure for the purposes of electromagnetic screening. That metal structure can be for example arranged on the side of the laminate composite, that is towards the threat, and/or the side of the laminate composite, that is remote from the threat, and/or can be integrated into the laminate composite.

The above-described bullet-resistant transparent laminate composite according to the invention is preferably produced by a process comprising the steps of arranging the plates and the intermediate layer or layers and optionally the polycarbonate plate; surrounding the arrangement with a flexible and fluid-tight enclosure; producing a reduced pressure in the enclosure; and acting on the arrangement surrounded by the enclosure with pressure and temperature in an autoclave.

The above-described bullet-resistant composite body according to the invention can advantageously be used for vehicles and craft (land vehicles, water craft, aircraft), mobile apparatuses and/or fixed installations (buildings, parts of buildings, production centres, machine tools and so forth).

In accordance with a second aspect of the invention the aforementioned object is attained by a protection arrangement having an opening in a wall of a protection housing or a protected object, a bullet-resistant transparent laminate composite arranged in the opening, and a holding device for fixing the laminate composite in the opening, which has an inner support structure on the side remote from the threat and an outer support structure on the side towards the threat. It is further provided that the composite body on its side remote from the threat is of a shape which substantially conically tapers towards the side remote from the threat and which bears against the inner support structure of the holding device.

Various demands are made on such protection arrangements such as a high level of ballistic safety, a high degree of resistance to mechanical and thermal stresses and the greatest possible field of vision. Those demands are met by the above-described protection arrangement of the invention better than by conventional protection arrangements of that kind which are usually formed with laminate composites in the form of a parallelepipedic block.

The bullet-resistant transparent laminate composite serves for ballistic protection within the opening of the wall of the object. The inner and outer support structures of the holding device provide that the laminate composite is securely held in that opening and can withstand mechanical loadings. By virtue of the differing materials of the wall of the object, the holding device and the laminate composite, fluctuations in temperature involve expansion and contraction phenomena of differing degrees in respect of those components. With the construction of the protection arrangement according to the invention however that does not lead to thermally induced stresses as the composite body, upon thermal expansion which is generally greater than that of the holding device and the wall of the object, moves somewhat outwardly along its conically shaped inner portion in the direction of the threat.

The conical configuration of the composite body on the side remote from the threat also affords a relatively great field of vision without the laminate composite having to be of a correspondingly large configuration over its entire thickness. That results in a reduction in the weight of the laminate composite and thus the entire protection arrangement.

In a preferred embodiment of the invention the protection arrangement has a viewing opening which is smaller than the opening in the wall of the protection housing or the protected object. That is preferably achieved by the inner support structure of the holding device having a substantially conically shaped portion which converges laterally inwardly in the direction towards the side remote from the threat and substantially corresponds to the configuration of the conical portion of the laminate composite. Depending on the respective size of that conical inner support structure, besides the better seat for the laminate composite, the arrangement also provides an improved ballistic protection effect as the conically shaped support structure provides for ballistic protection on the inside of the transparent laminate composite. In other words, only a relatively small hit area is presented to a shell or projectile, in spite of a large field of vision, with respect to the total area of the opening in the wall.

In a configuration of the invention the laminate composite is accommodated in the direction of its thickness between the inner support structure and the outer support structure of the holding device, and the holding device in the direction of the thickness of the laminate composite is of an inside dimension which is larger than the overall thickness of the received laminate composite at normal temperature, so that the laminate composite can move outwardly in the direction of the threat upon an increase in temperature and thermal expansion linked thereto. In addition preferably also the holding device in the directions perpendicularly to the direction of the thickness of the laminate composite is of inside dimensions which are greater than the outside dimensions of the received laminate composite at normal temperature.

In a further configuration of the invention the inner support structure of the holding device is provided with an elastic seal on its side towards the laminate composite and also the outer support structure of the holding device is provided with an elastic seal on the side towards the laminate composite. Those seals stably clamp the laminate composite between the inner and outer support structures of the holding device and nonetheless permit a movement of the laminate composite in the direction of its thickness upon thermally induced expansion or contraction.

In a particularly preferred embodiment of the invention the laminate composite on the side of its conical portion, that is towards the threat, has a substantially parallelepipedic portion which perpendicularly to the direction of the thickness of the laminate composite is of a larger cross-sectional area than the conically shaped portion and thus forms a laterally projecting edge with respect to the conical portion. In addition provided between an edge, that is remote from the threat, of that parallelepipedic portion and the wall forming an edge of the opening, there is a gap which in the direction of threat or in the direction of the thickness of the laminate composite is smaller than the maximum degree of compression of the elastic seal at the inner support structure in that direction. The consequence of that is that, upon a pressure loading on the protection arrangement from the threat side, the edge of the parallelepipedic portion of the laminate composite is supported against the wall of the protection housing or the protected object and thus transmits the pressure forces into the wall, instead of being supported with its conical portion against the holding device. A protection arrangement of that structure therefore has a greater resistance to blast loadings.

The angle of the conical portion of the inner support structure of the holding device with respect to the direction of the thickness of the laminate composite is for example greater than about 20°, preferably greater than about 30° or greater than about 35° or greater than about 40°. Depending on the materials of the inner support structure of the holding device or the seal arranged there and the laminate composite that angle must be so selected that no self-locking action occurs between the two components and the laminate composite can move in the direction of its thickness.

In an embodiment of the invention the holding device is at least partially integrally formed with the wall of the protection housing or the protected object. For example the inner support structure or the outer support structure of the holding device can be formed integrally on the object wall. Alternatively the holding device can also be in the form of a component separate from the wall of the protection housing or the protected object. It the holding device is separate from the housing wall or the object wall the unit comprising the holding device and the laminate composite received therein can advantageously also be designed as an emergency escape hatch.

In a further configuration of the protection arrangement the holding device can be selectively of a one-part or multi-part configuration.

In addition a protection device against laser beams can further be arranged in the opening. For example a laser protection film can be provided on the side of the laminate composite, that is towards the threat, and/or on the side of the laminate composite, that is remote from the threat.

In a further configuration of the invention in addition a metal structure for the purposes of electromagnetic screening can be arranged in the opening, which is electrically conductingly connected to the wall of the protection housing or the protected object. That metal structure for example can be arranged on the side of the laminate composite, that is towards the threat, and/or on the side of the laminate composite that is remote from the threat, and/or can be integrated into the laminate composite itself.

It will be appreciated that the bullet-resistant transparent laminate composite according to the present invention can also be particularly advantageously used in that protection arrangement.

Depending on the respective configuration of the protection housing or the protected object the bullet-resistant transparent laminate composite arranged in the opening can be entirely or partially of a planar, one-dimensionally curved (for example in the shape of a circular arc) or two-dimensionally curved (for example spherical) configuration.

The protection arrangement according to the invention, like also the above-described bullet-resistant laminate composite of the invention, can advantageously be used for vehicles and craft (land vehicles, water craft, aircraft), mobile apparatuses and/or fixed installations (buildings, parts of buildings, machines and so forth).

BRIEF DESCRIPTION OF THE DRAWINGS

The foregoing and further features and advantages of the invention will be better appreciated from the description hereinafter of preferred, non-limiting embodiments by way of example with reference to the accompanying drawings in which.

DETAILED DESCRIPTION OF THE EMBODIMENTS PREFERRED AT THE PRESENT TIME

Figure 1:
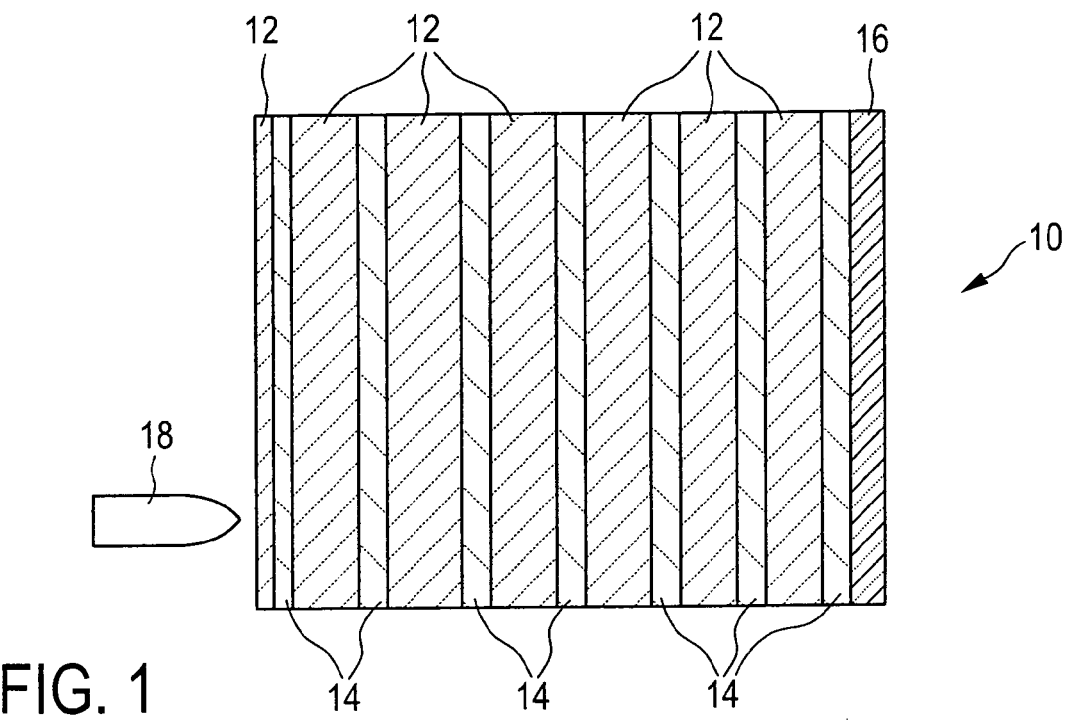
FIG. 1 shows a diagrammatic sectional view of the structure of a bullet-resistant transparent laminate composite in a first embodiment of the present invention.
Figure 2:
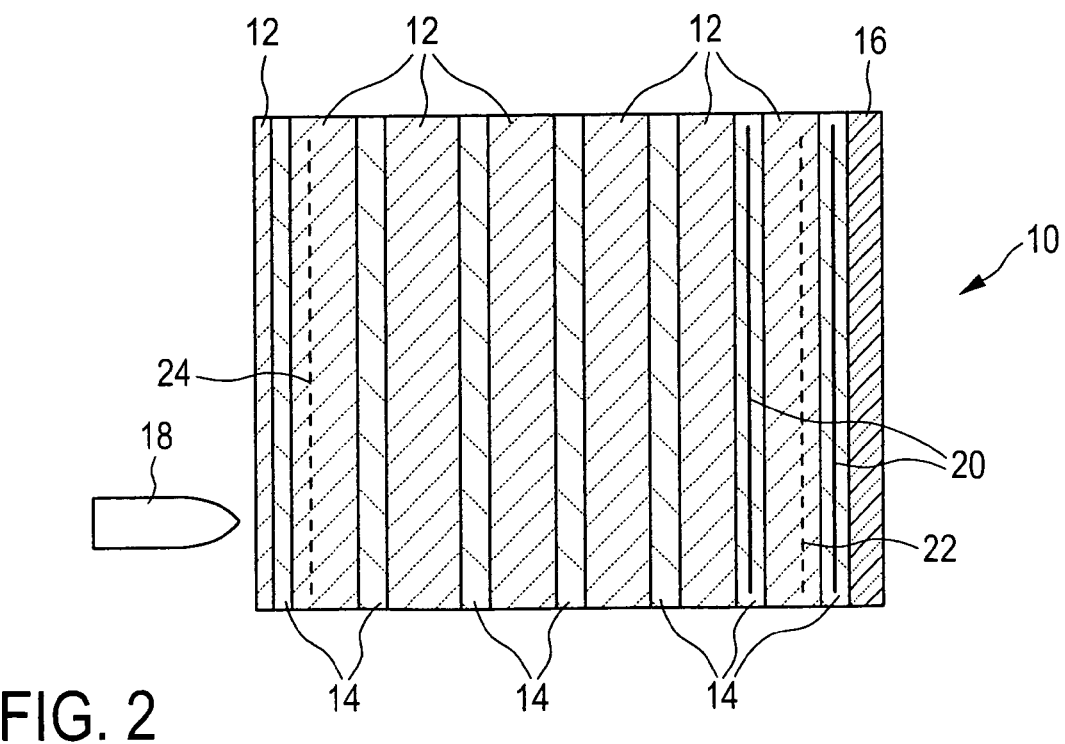
FIG. 2 shows a diagrammatic sectional view of the structure of a bullet-resistant transparent laminate composite in a second embodiment of the present invention.
Figure 3A:
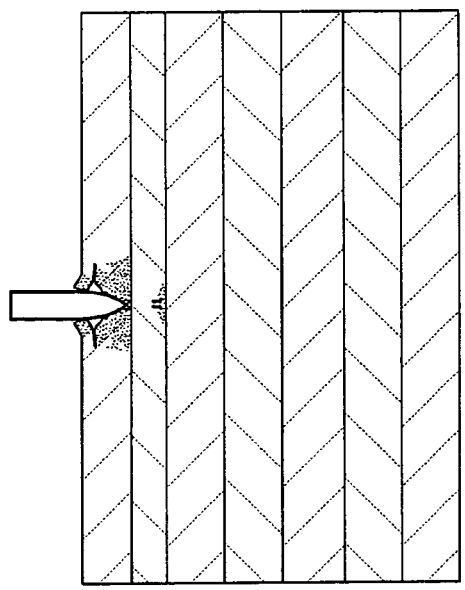
FIGS. 3 and 4 show a comparison of the functional capability between a bullet-resistant composite body according to the invention and a conventional composite body on the basis of various snapshots of a hit simulation.
Figure 4A:
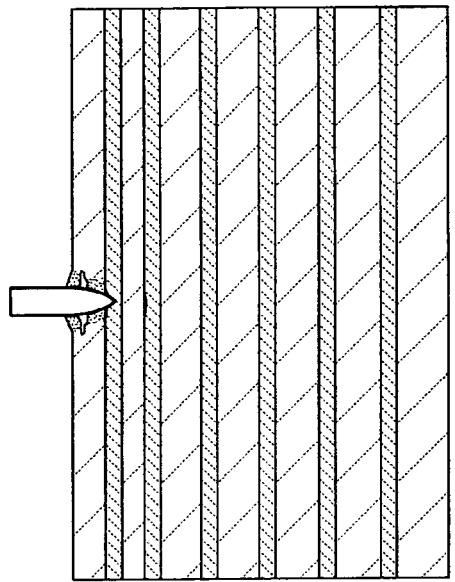
Figure 3B:
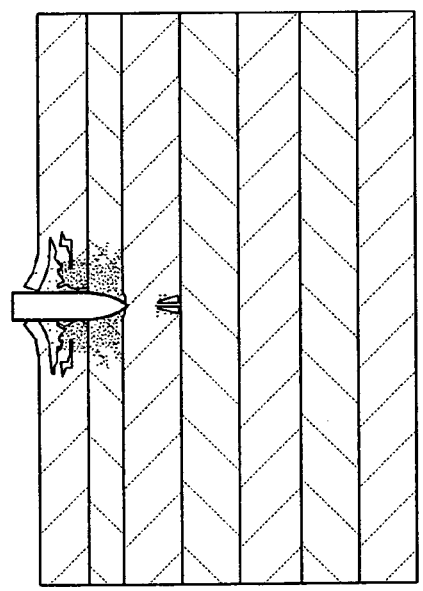
Figure 4B:
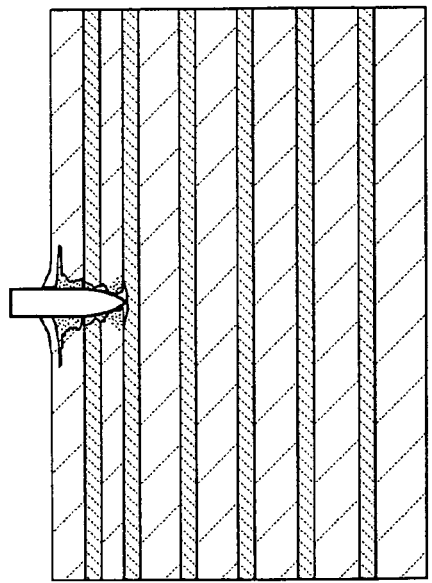
Figure 3C:
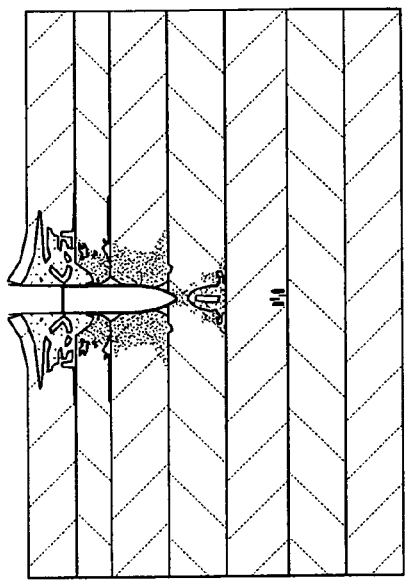
Figure 4C:
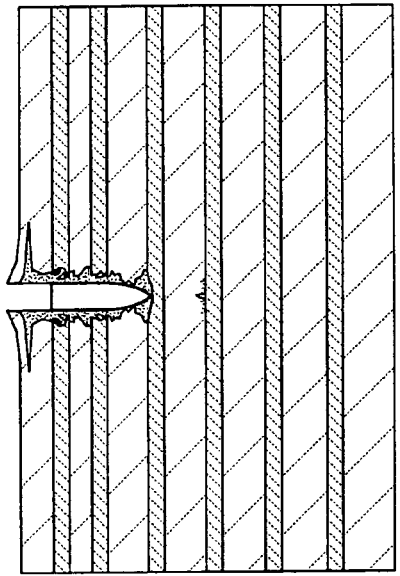
Figure 3D:
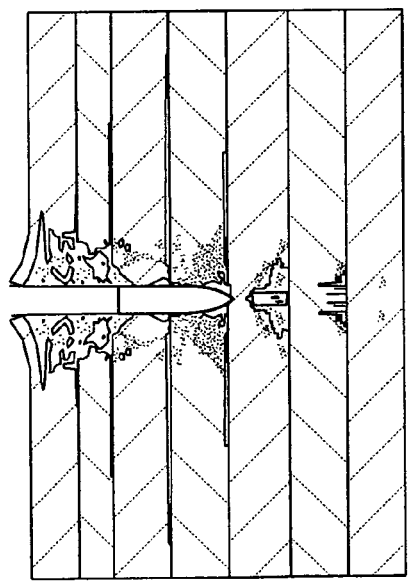
Figure 4D:
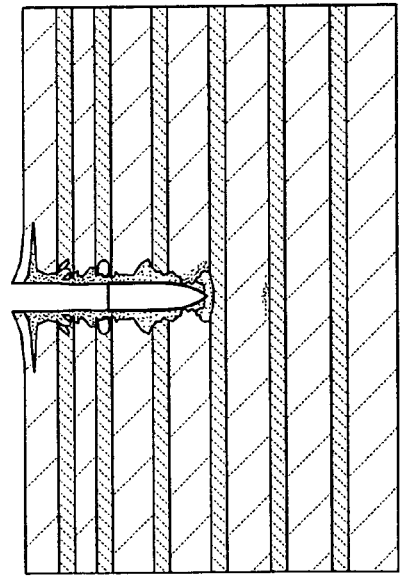

Referring to FIGS. 1 and 2 two preferred embodiments of a bullet-resistant transparent laminate composite (hereinafter also referred to as the composite body) according to the present invention are firstly described in greater detail.

The composite glass block 10 is made up of a plurality of plates 12 comprising a transparent first material such as for example acrylic glass (PMMA, Plexiglas), glass (silicate glass) or transparent ceramic, which are arranged at a mutual spacing one behind the other in the direction of the threat and between which there is a respective intermediate layer 14 comprising a transparent second material such as for example polyurethane (PU) or thermoplastic polyurethane (tPU). Arranged on the side of the composite body 10, that is remote from the threat—optionally by way of the connection of a further intermediate layer 14 comprising the transparent second material—there is also preferably a plate 16 of polycarbonate (PC) which in known fashion provides fragment splinter protection on the side remote from the threat.

The threat 18 represented by a shell or projectile defines a direction of threat and the direction of the thickness of the laminate composite 10 is defined as being parallel to that direction of threat. The below-mentioned layer thicknesses of the individual components are respectively related to a direction parallel to that direction of threat. That applies irrespective of the fact that a real threat can naturally also hit the composite body 10 at an angle. In FIGS. 1 and 2, the side of the laminate composite 10, that is towards the threat 18, is towards the left while the side remote from the threat 18 is shown towards the right.

In addition the terms "inner" and "outer" respectively refer to the side of the composite body 10, that is remote from the threat, and the side of the composite body 10, that is towards the threat, unless otherwise specified.

The plates 12 are generally made from a transparent first material whose modulus of elasticity is at least about 1,500 N/mm$^2$ or at least about 2,000 N/mm$^2$ or at least about 2,500 N/mm$^2$, that is to say a relatively hard material. The intermediate layers 14 are generally made from a transparent second material whose modulus of elasticity is lower than that of the first material, that is to say a softer material. The material PU or tPU preferably used for the intermediate layers 14, depending on the respective configuration involved, has for example a modulus of elasticity in the region of from 10 to 1,500 N/mm$^2$, wherein here the modulus of elasticity preferably selected is about 30 to 800 N/mm$^2$, preferably about 50 to 100 N/mm$^2$. Overall the layer thicknesses of the plates 12 and the intermediate layers 14 are so selected that the overall layer structure of plates and intermediate layers, in comparison with a block of the same overall thickness which is made exclusively from the first, that is to say harder material, has a modulus of elasticity which is reduced by at least 10%. Preferably that reduction is in the region of about 30% to about 50%.

The layer thicknesses of the plates 12 are for example in a region of about 2 mm to about 25 mm, preferably in a region of about 5 mm to about 20 mm. The layer thickness of the polycarbonate plate 16 is for example in a region of about 3 mm to about 10 mm, in which respect it is optionally also possible to dispense with that polycarbonate plate 16. The layer thicknesses of the intermediate layers 14 are for example in a region of about 2 mm to about 10 mm, preferably in a region of about 3.5 mm to about 7.5 mm. For comparison the plastic films, serving as pure adhesive layers, of conventional composite glass blocks usually only involve layer thicknesses in the region of about 0.1 to 2 mm. Depending on the respective layer thickness those intermediate layers 14 can be optionally of a single-layer or multi-layer configuration. The overall thickness of the composite body is for example in a region of about 20 mm to about 250 mm or 300 mm, but can also be up to 500 mm or more depending on the respective threat or situation of use. It is preferably in the region of about 80 mm to about 200 mm, still more preferably in the region of about 100 mm to about 150 mm, most preferably in the region of about 115 mm to about 125 mm.

It is also advantageous if the plates 12—optionally with the exception of an outer cover plate (entirely at the left in FIG. 1)—are of greater layer thicknesses in a region on the side towards the threat, than the plates 12 in a region on the side of the laminate composite 10, that is remote from the threat.

The numbers of plates 12 and intermediate layers 14 are not limited to the embodiment shown in FIG. 1. In accordance with this invention the laminate composite 10 generally comprises at least two plates 12, between which is arranged a respective intermediate layer 14.

Although FIGS. 1 and 2 only show flat or planar plates 12 and intermediate layers 14 for constructing the composite body 10, one-dimensionally or two-dimensionally curved configurations of composite bodies are equally possible in accordance with the invention. It will be appreciated that the composite body can also be of a partially planar and partially curved configuration. Similarly, besides rectangular standard shapes, any outside shapes for the composite bodies are also in accordance with the invention. Furthermore the individual plates 12 and intermediate layers 14 also do not necessarily have to be of uniform layer thicknesses over their entire extent, the thicknesses can also selectively vary within a plate 12 or intermediate layer 14 respectively.

In a specific embodiment shown in FIG. 1 the layer structure is as follows, with the respective layer thicknesses.

The thicknesses of the intermediate layers 14 of thermoplastic polyurethane (tPU) are uniformly about 4.5 mm. From the side of the laminate composite 10, that is towards the threat, towards the side that is remote from the threat, a first cover plate 12 of acrylic glass of a thickness of about 3 mm is adjoined by overall three plates 12 of acrylic glass of a thickness each of about 15 mm, followed overall by three plates 12 of acrylic glass of a thickness each of about 12 mm and a concluding plate 16 of polycarbonate (PC) of a thickness of about 5 mm. The overall thickness of that composite body 10 is thus about 120.5 mm.

In a further embodiment of the laminate composite 10 which has been investigated the thicknesses of the intermediate layers 14 of thermoplastic polyurethane (tPU) are all each 5 mm. From the side of the composite body 10, that is towards the threat, towards the side that is remote from the threat, there are a first cover plate 12 of acrylic glass of a thickness of about 5 mm, a total of four plates 12 of acrylic glass of a thickness each of about 15 mm, a total of two plates 12 of acrylic glass of a thickness each of about 10 mm and a concluding plate 16 of polycarbonate (PC) of a thickness of about 5 mm. The overall thickness of that composite body 10 is thus about 125 mm.

FIG. 2 shows a second embodiment of a laminate composite 10 according to the invention, which includes some possible modifications to the foregoing first embodiment.

In comparison with the foregoing first embodiment, this transparent laminate composite 10 of the second embodiment has an additional mechanical stiffening means. More precisely at least one (two in the case of FIG. 2) of the intermediate layers 14, on the side of the composite body 10, that is remote from the threat, includes wires or a wire arrangement. Those wire arrangements 20 can be integrated into the intermediate layers 14 by virtue of the greater thicknesses thereof and can carry a tensile stress on the tensile side, that is to say the side of the laminate composite 10, that is remote from the threat, and thus mechanically stabilise the composite body 10.

Additionally or alternatively a pane heating means can be integrated into the composite body 10. For example an inner pane heating means 22 is integrated in one of the inner plates 12 and/or an outer pane heating means 24 is integrated in one of the outer plates 12.

The other features of this laminate composite 10 correspond to those of the foregoing first embodiment.

While bullet-resistant composite bodies in the state of the art are usually produced in special presses (see for example WO 93/16872 A1) the laminate composite 10 of the present invention is advantageously produced in an autoclave. It will be appreciated however that production by means of presses is also possible in the case of the laminate composite according to the invention.

In production of the bullet-resistant composite body firstly the plates 12 and the intermediate layer or layers 14 and optionally the polycarbonate plate 16 of the desired layer thicknesses are arranged one upon the other in the desired sequence to correspond to the composite body 10 to be produced. That layered arrangement is then surrounded by a flexible and fluid-tight enclosure and a reduced pressure is produced in the enclosure so that the enclosure bears firmly against the layer structure and fixes it. Finally the arrangement enclosed by the enclosure is subjected to pressure and temperature in an autoclave to form a strong composite of the layers 12, 14, 16.

The mode of operation of the laminate composite 10 involving the above-discussed structure according to this invention is described in detail hereinafter with reference to FIGS. 3 and 4.

In this respect FIG. 4 shows generally two time-successive snapshots during a bombardment hit on a bullet-resistant laminate composite 10 according to the invention and FIG. 3 shows as comparison the snapshots at corresponding times during a hit on a conventional composite glass block in which a plurality of acrylic glass plates are glued together with thin plastic films. The views in FIGS. 3 and 4 are respectively based on a hit simulation carried out by the inventors.

The views A each show the situation about 15 μsec after the impact of the shell 18 against the first transparent plate 12 towards the threat, the views B each show the situation about 30 μsec after the impact, the views C each show the situation about 52.5 μsec after the impact and the views D each show the situation about 75 μsec after the impact. The transparent plates 12 of the harder material are each shown light while the intermediate layers 14 of the softer material are each shown dark.

While the performance of the laminate composite at the beginning of penetration of the shell (FIGS. 3A and 4A) is still very similar with the conventional composite body and the composite body according to the invention, it is already possible somewhat later to see (FIGS. 3B and 4B) that the shock wave leading the shell 18, in the case of the conventional laminate composite, penetrates substantially further thereinto and is partially reflected at the thin adhesive layers and comes back again, while in the case of the laminate composite according to the invention with the thicker intermediate layers 14 of the softer material it is already almost totally absorbed at the next intermediate layer 14 (dissipation of the shock waves in the elastic intermediate layers). That effect becomes even clearer in the views C and D.

It can further be seen that in the conventional laminate composite the intermediate layers break open laterally very wide upon penetration of the shell 18 whereas in the case of the laminate composite constructed according to the invention dissipation of the energy due to the speed of the shell 18 occurs by virtue of elastic deformation, in particular a change in thickness, of the intermediate layers 14 (see in particular FIGS. 4C and 4D) and the energy can be locally very restrictedly absorbed so that the laminate composite of the invention only very limitedly breaks open in the lateral direction (vertical direction in FIGS. 3 and 4). That in turn means that destruction of the laminate composite occurs only in very local fashion upon impact and the laminate composite remains transparent and operable in large parts thereof. That therefore provides what is referred to as multi-hit capability on the part of the laminate composite, which hitherto could not be achieved with conventional composite bodies of comparable weight.

It has also been found that this advantageous performance of the laminate composite according to the invention also occurs over a very wide temperature range. The multi-hit capability of the bullet-resistant transparent laminate composite can be ensured without any problem for example in a range of use of from −30° C. to +50° C.

A preferred embodiment of a protection arrangement will now be described with reference to FIGS. 5 to 8, in which a laminate composite involving the above-described structure of the invention can advantageously be used.

Figure 5:
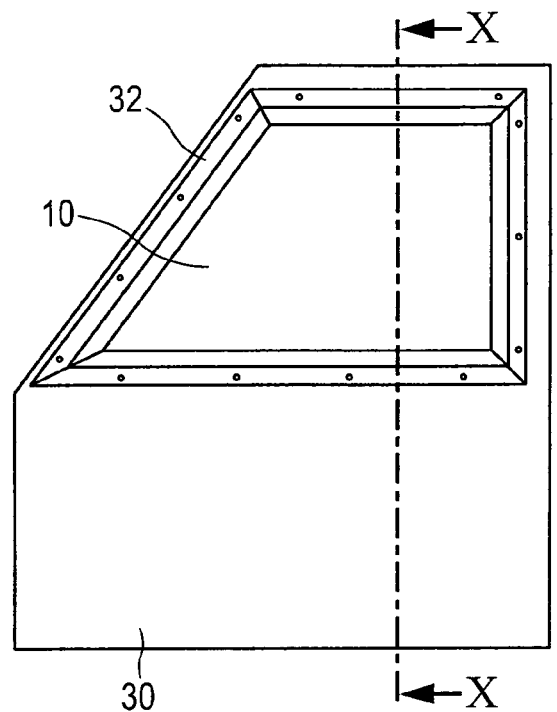
FIG. 5 shows a side view of a protection arrangement with a bullet-resistant transparent laminate composite according to the present invention.

FIG. 5 firstly shows by way of example the outside, that is to say the side towards the threat, of a door of an armoured vehicle as the wall 30 of a protected object in which a quadrangular opening 32 is provided in the upper region. While the door 30 itself is made for example from a ballistically effective armour steel, the opening 32 is closed by a transparent bullet-resistant composite body 10. The composite body 10 is advantageously a laminate composite of the above-described structure according to the invention, without the protection arrangement according to the invention however being intended to be restricted only to that composite body.

Figure 7:
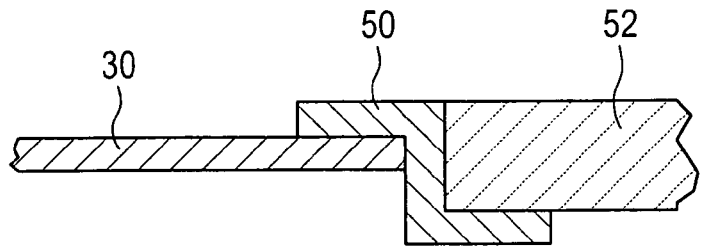
FIGS. 7 and 8 show diagrammatic views in section of conventional protection arrangements for comparison.
Figure 8:
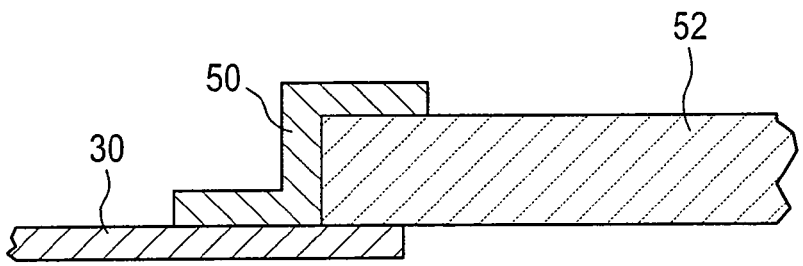

As shown in FIGS. 7 and 8 conventionally a substantially parallelepipedic composite glass block 52 is fixed in the opening in the wall 30 by means of a frame-shaped holding device 50, wherein the holding device 50 is mostly of a Z-shaped configuration and the edge of the composite body 52 is glued into the holding device 50 (see FIG. 7) or clamped between a limb of the holding device 50 and the wall 30. A disadvantage with those known protection arrangements are the restricted field of vision through the composite body, non-optimum fixing in particular of composite bodies of relatively great overall thicknesses, inadequate ballistic protection (in particular inadequate multi-hit capability), the large hit area and fixing problems due to the different coefficients of thermal expansion of the material components involved.

The construction according to the invention of the protection arrangement overcomes the specified disadvantages in the state of the art.

Figure 6:
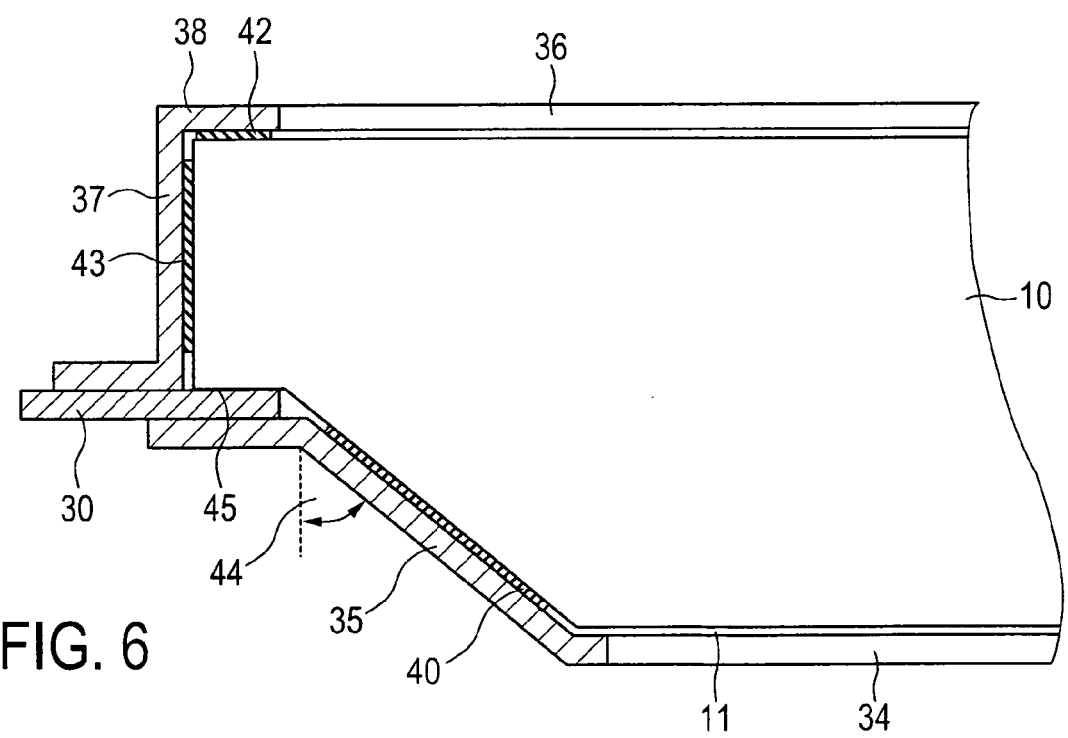
FIG. 6 shows a diagrammatic view in section of a protection arrangement according to a preferred embodiment of the present invention.

FIG. 6 diagrammatically shows a view in section of a preferred embodiment of the protection arrangement. In FIG. 6 the threat side, for example the outside of the door 30, is upward and the direction of threat or the direction of the thickness of the arrangement/composite body extends substantially vertically.

A holding device for receiving the composite body 10 is provided along the periphery of the opening 32 in the wall 30. The holding device substantially comprises an inner frame part 34 and an outer frame part 36. The inner frame part 34 is preferably arranged on the inside of the wall 30 and has an inner support structure 35 having a substantially conical portion which converges laterally inwardly in the direction towards the side of the protection arrangement, that is remote from the threat, that is to say for example in the direction of the vehicle or craft interior. In addition, provided on that conical inner support structure 35 is a peripherally extending seal 40 for example of foam rubber or the like.

The outer frame part 36 is preferably arranged on the outside of the wall 30 and is in the form of a substantially Z-shaped frame configuration with an outer support structure 38 and a lateral support structure 37. Preferably a peripherally extending seal 42 for example of foam rubber or the like is provided on the inside of the outer support structure 38. Optionally, a peripherally extending seal 43 for example of foam rubber or the like is also provided on the inside of the lateral support structure 37.

Both the inner frame part 34 and also the outer frame part 36 of the holding device are fixedly connected to the wall 30, for example by welding. In the FIG. 6 embodiment those two components 34, 36 of the holding device are in the form of components separate from the wall 30 of the protected object. Alternatively it is also possible for the holding device to be at least partially integral with the wall 30, by for example the inner frame part 34 of the holding device being formed integrally with the wall 30 and bent inwardly therefrom.

In addition it is also possible for the holding device 34-38 to be mounted releasably in the opening 32 of the object wall 30 and in that way for example to construct an emergency escape hatch in an armoured vehicle.

The holding device, in particular the inner support structure 35 of the inner frame part 34 and the lateral support structure 37 and the outer support structure 38 of the outer frame part 36 form together with the edge of the opening 32 or the wall 30, a receiving means for a composite body 10. That composite body or laminate composite 10 is naturally shaped to correspond to the shape of that receiving means. In particular on its side remote from the threat the composite body 10 is of a substantially conically tapering shape substantially corresponding to that of the inner support structure 35 of the inner frame part 34 of the holding device.

Figure 9:
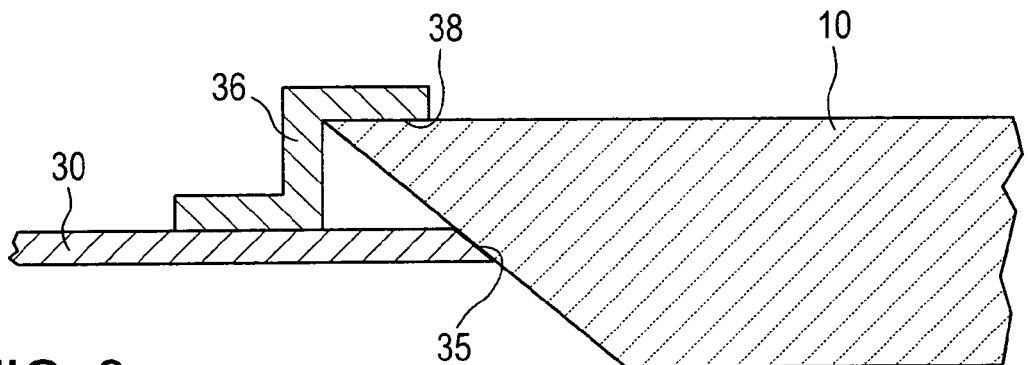
FIG. 9 shows a diagrammatic view in section of a protection arrangement according to a further embodiment of the present invention.

In the illustrated embodiment that conical portion of the composite body 10 on its side towards the threat, is adjoined by a substantially parallelepipedic portion. The size relationships between the conical and parallelepipedic portions of the composite body 10 however are not intended to be restricted to those shown in FIG. 6; optionally it is also possible to entirely dispense with a parallelepipedic portion as also shown in FIG. 9 described hereinafter.

The dimensions of the holding device 34-38 and the composite body 10 are preferably so selected that at normal temperature the inside dimensions of the holding device in the direction of the threat, that is to say the axial spacing between the outer support structure 38 of the outer frame part 36 and the concluding edge of the inner frame part 34 as well as between the outer support structure 38 of the outer frame part 36 and the outside of the wall 30 are somewhat larger than the overall thickness of the composite body and the inside dimensions of the holding device 34-38 in the directions perpendicular to the direction of threat are somewhat greater than the outside dimensions of the received composite body 10. That means that at normal temperature the composite body 10 is received in the holding device 34-38 with play, but is nonetheless sufficiently fixed by virtue of the peripherally extending seal 40, 42.

Upon fluctuations in temperature the materials of the wall 30 and the holding device 34-38 and the materials of the composite body 10 expand or contract to a differing degree relative to each other by virtue of their differing coefficients of thermal expansion. At higher temperatures for example the material of the composite body 10 generally expands more greatly than the metal of the holding device 34-38 and the wall 30. In that case the composite body 10 is pushed outwardly (upwardly in FIG. 6) by the oppositely disposed conical surfaces and in so doing compresses the seals 40, 42 against the insides of the conical inner support structure 35 and the outer support structure 38 of the frame parts 34, 36. The lateral expansion of the parallelepipedic portion of the composite body 10 is absorbed in the further lateral support structure 37 of the outer frame part 36.

To permit that movement of the composite glass block 10 upon thermal expansion the angle 44 of the conical inner support structure 35 of the inner frame part 34 with respect to the direction of threat or the direction of the thickness of the composite body must be selected to be so great as to avoid a self-locking effect between the conical support structure 35 and the conical portion, bearing thereagainst, of the composite body 10. For that purpose, depending on the respective materials of the components involved, that angle 44 is preferably greater than about 20°, preferably greater than about 30° or greater than about 35° or greater than about 40°.

In addition the thicknesses of the seals 40, 42, 43 are for example in a region of about 4 mm to about 8 mm and in the case of a laminate composite 10 of an overall thickness of the order of magnitude of about 120 mm, they should be able to absorb a displacement or expansion of the laminate composite 10 in the direction of its thickness in the region of about 3 mm.

As described the protection arrangement of such a structure satisfies very high demands in relation to the mechanical and thermal stresses in operation. In addition that protection arrangement ensures excellent ballistic protection against threats involving armour-piercing munition and the like.

In another particularly preferred embodiment the dimensions of the holding device 34-38, in particular its outer frame part 36, and the laminate composite 10, in particular its outer parallelepipedic portion, are so selected that between the edge, remote from the threat, of the parallelepipedic portion of the laminate composite 10 and the edge, forming the edge of the opening 32, of the object wall 30, there is a gap 45 which—in the direction of threat or the direction of the thickness of the laminate composite—is smaller than the maximum degree of compression of the seal 40 at the conical inner support structure 35 in that direction.

That construction affords a particular advantage for the protection arrangement in the case of a blast loading, that is to say a severe pressure wave. When such a blast hits the protection arrangement the laminate composite 10 is pressed inwardly in the direction of the threat. That movement of the laminate composite 10 occurs until the outer edge of the parallelepipedic portion of the laminate composite 10 is pressed against the object wall 30 at the edge of the opening 32. In that condition the seal 40 is not yet compressed to its maximum at the conical inner support structure 35 of the inner frame part 34 so that the conical inner portion of the laminate composite 10 is still not supported against that inner support structure 35. The consequence of this is that the pressure loading is not carried by the laminate composite 10 or the holding device 34-38 but by the construction of the protection housing, surrounding the opening 32, that is to say the wall 30.

With that construction therefore the protection arrangement of the invention also has an excellent protection effect in relation to blast loadings.

It will be appreciated that the composite body 10 of the invention described hereinbefore with reference to FIGS. 1 to 4 can advantageously be used in that protection arrangement shown in FIGS. 5 and 6, thereby affording in the region of the transparent laminate composite 10 excellent ballistic protection which, in contrast to conventional composite bodies, enjoys a markedly improved multi-hit capability, as described hereinbefore.

It can further be seen from FIG. 6 that, in contrast to conventional protection arrangements, in relation to the opening 32 in the wall, which is to be transparently closed by the composite body 10, there remains only a relatively small region which is defined by the inner end 11 of the conically tapered region of the composite body 10 and for which the ballistic protection action of the composite body 10 is crucial. Outside that inner end 11 ballistic protection of the protection arrangement is determined by the protection action of the wall 30 and the inner frame part 34 which, in the case of an armoured vehicle as a protected object, are produced for example from armour steel, and in addition also by the outer layers of the laminate composite 10 which are of a greater lateral extent than the inner end 11 of the laminate composite 10.

In spite of that inner end 11 of the laminate composite 10, that is reduced in size in relation to the opening 32 and the part of the composite body 10, that is visible from the exterior, that is to say from the side of the threat, the field of vision for a person is not restricted on the inside of that protection arrangement. By virtue of the conicity at least of the inner portion of the composite body 10 the field of vision corresponds at least to that of a generally parallelepipedic composite body 10 involving the outside dimensions of the outer portion held by the outer frame part 36.

Finally various modifications to the protection arrangement which are in accordance with the invention will be described with reference to FIG. 9.

As shown in FIG. 9 the composite body 10 in this embodiment has exclusively a conically shaped portion. In addition it is also conceivable to arrange on the side remote from the threat, adjoining the conical portion, a parallelepipedic portion of smaller cross-sectional area (corresponding for example to the smaller base of the truncated cone).

In addition the holding device in the FIG. 9 structure does not include an inner frame part 34. In this embodiment the inner support structure 35 of the holding device is provided directly at the edge of the opening 32 in the wall 30 in the form of a conically shaped seat.

It is further pointed out that the conically shaped portions of the laminate composite 10 and the inner support structure 35 of the holding device do not necessarily have to be straight, as shown in FIGS. 6 and 9. Optionally the conical portions can also be convexly or concavely curved at least in partial regions thereof. In the same manner the inner and outer ends of the laminate composite 10 also do not necessarily have to be flat but can optionally also have a curvature at least in partial regions thereof. In that way it is optionally possible to achieve an additional lens action for the laminate composite 10. The above-described process for the production of the laminate composite 10 in an autoclave is of particular advantage, when curved surfaces are involved, in comparison with production in a press.

By virtue of the improved properties of this protection arrangement it is particularly suitable for the military sector. Nonetheless such a protection arrangement can naturally also be used in the civil sector, in which case generally the overall thickness of the composite body can be reduced in comparison with the military situations of use.

Figure 10:
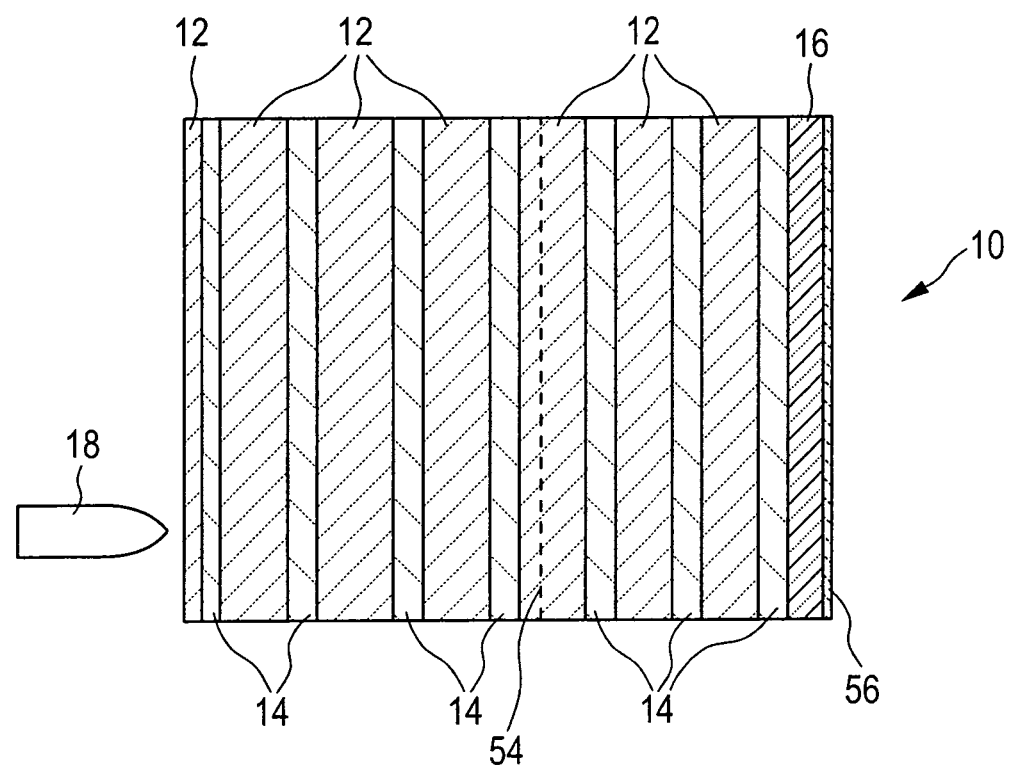
FIG. 10 shows a diagrammatic sectional view of the structure of a bullet-resistant transparent laminate composite in a further embodiment of the present invention.

Referring to FIG. 10 a further embodiment of a laminate composite 10 according to the invention will now be described, which includes further possible modifications to the foregoing first embodiment and which can obviously also advantageously be used in the above-described protection arrangement.

In comparison with the foregoing first embodiment this transparent laminate composite 10 provides that an additional metal structure is integrated into at least one of the layers 12 or 14. That metal structure serves for electromagnetic screening. When that laminate composite 10 is fitted into an opening 32 in a protection apparatus the metal structure is electrically conductingly connected to the wall 30 of the protection housing or the protected object.

Alternatively or additionally such a metal structure 54 can also be arranged on the side of the laminate composite 10, that is remote from the threat, and/or on its side that is towards the threat. Equally the metal structure can also be integrated into the laminate composite 10 between two layers 12, 14.

Additionally or alternatively the laminate composite 10 can also be provided with a transparent laser protection film 56. It is preferably disposed on the laminate composite 10 on the side thereof that is remote from the threat. Optionally however the laser protection film 56 may also be disposed on the side of the composite body, that is towards the threat 18, or integrated into the laminate composite 10, preferably between its layers.

The other features of that laminate composite 10 correspond to those of the foregoing first embodiment.

It will be appreciated that the features of this FIG. 10 embodiment can also be combined in any desired manner with those of the laminate composite of FIG. 2.

LIST OF REFERENCES 10 laminate composite or composite body
11 inner end of 10
12 transparent plates
14 transparent intermediate layers
16 polycarbonate plate 16
18 projectile, threat
20 wire reinforcements
22 pane heating means, internal
24 pane heating means, external
30 wall of an object to be protected
32 opening in 30
34 inner frame part
35 inner support structure of 34
36 outer frame part
37 lateral support structure of 36
38 outer support structure of 36
40 seal on 35
42 seal on 38
43 seal on 37
44 angle
45 gap
50 conventional holding device
52 conventional composite body
54 metal structure
56 laser protection film

The invention claimed is:

1. A bullet-resistant transparent laminate composite comprising:
   at least two plates arranged one behind the other and at a spacing relative to each other in the direction of threat, each of said at least two plates being formed of a transparent first material with a modulus of elasticity of at least 1,500 N/mm$^2$, wherein the transparent first material is a plastic material, and
   at least one respective intermediate layer of a transparent second material with a lower modulus of elasticity than that of the first material, said at least one intermediate layer being between said at least two plates, wherein the transparent second material is a polyurethane (PU), a thermoplastic polyurethane (tPU), a polyvinyl chloride (PVC), or polycarbonate (PC) based material,
   wherein the layer thicknesses of the plates and the at least one intermediate layer are so selected that the overall layer structure of the layer composite of plates and the at least one intermediate layer has an average modulus of elasticity which is at least 20% and at maximum 60% lower in comparison with a block made exclusively from the first material and of the same overall thickness,
   wherein the laminate composite in the direction of threat is of an overall thickness in the region of 20 mm to 300 mm; and
   wherein the layer thickness of the at least one intermediate layer is 3.5 mm to 7.5 mm.

2. The laminate composite according to claim 1, wherein the thicknesses of the plates are selected to be greater in a region on the side towards the threat than in a region on the side of the laminate composite that is remote from the threat.

3. The laminate composite according to claim 1, wherein there are provided means for carrying tensile stresses in the at least one intermediate layer in a region of the laminate composite that is remote from the threat.

4. The laminate composite according to claim 1, wherein a pane heating means is integrated in at least one of a plate on the side of the laminate composite, that is towards the threat, and a plate on the side of the laminate composite, that is remote from the threat.

5. The laminate composite according to claim 1, wherein the laminate composite further has a plate of polycarbonate on its side remote from the threat.

6. The laminate composite according to claim 1, wherein the laminate composite is provided with a protection device against laser beams.

7. The laminate composite according to claim 1, wherein the laminate composite is provided with a metal structure for electromagnetic screening.

8. A process for the production of a bullet-resistant transparent laminate composite according to claim 1, comprising the steps of:
   arranging the plates, the intermediate layer and optionally the polycarbonate plate;
   surrounding the arrangement with a flexible and fluid-tight enclosure;
   producing a reduced pressure in the enclosure; and
   acting on the arrangement surrounded by the enclosure with pressure and temperature in an autoclave.

9. The laminate composite according to claim 1, further comprising a plurality of intermediate layers between said at least two plates.

10. The laminate composite according to claim 9, wherein at least one of said plurality of intermediate layers has a layer thickness of 3.5 mm to 7.5 mm.

* * * * *

UNITED STATES PATENT AND TRADEMARK OFFICE
CERTIFICATE OF CORRECTION

PATENT NO. : 8,833,233 B2  
APPLICATION NO. : 12/997873  
DATED : September 16, 2014  
INVENTOR(S) : Thomas Krueger et al.

Page 1 of 1

It is certified that error appears in the above-identified patent and that said Letters Patent is hereby corrected as shown below:

Title page

Item (73), please replace "Geesthact" with -- Geesthacht --.

Signed and Sealed this
Twenty-second Day of September, 2015

Michelle K. Lee
*Director of the United States Patent and Trademark Office*